(12) United States Patent
Idemura et al.

(10) Patent No.: US 9,167,145 B2
(45) Date of Patent: Oct. 20, 2015

(54) RECEIVING DEVICE FOR RECEIVING A WIRELESS OPERATION SIGNAL FOR CONTROLLING A LENS OR A CAMERA BY A FIRST OR A SECOND METHOD

(75) Inventors: Takeshi Idemura, Saitama (JP); Norio Nakai, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 13/080,854

(22) Filed: Apr. 6, 2011

(65) Prior Publication Data

US 2011/0249174 A1 Oct. 13, 2011

(30) Foreign Application Priority Data

Apr. 9, 2010 (JP) .................................. 2010-090426

(51) Int. Cl.
*H04N 5/232* (2006.01)
*G03B 17/56* (2006.01)

(52) U.S. Cl.
CPC .................................. *H04N 5/23206* (2013.01)

(58) Field of Classification Search
CPC ........................... G03B 17/56; H04N 5/23206
USPC ...................... 348/360, 333.07; 396/419–428, 396/373–386; 248/187.1; 206/316.2; D16/242–245
See application file for complete search history.

(56) References Cited

U.S. PATENT DOCUMENTS 5,272,342 A 12/1993 Kotani
5,767,906 A * 6/1998 Toyofuku et al. ............. 348/375

2006/0055821 A1* 3/2006 Sousa ........................... 348/375
2011/0129210 A1* 6/2011 McGucken .................... 396/422
2011/0181766 A1* 7/2011 Hashiguchi ............... 348/333.12

FOREIGN PATENT DOCUMENTS

| JP | 05-021564 A | 1/1993 |
|----|-------------|--------|
| JP | 05-137043 A | 6/1993 |
| JP | 2003-245114 A | 9/2003 |
| JP | 2005-354419 A | 12/2005 |
| JP | 2006-033284 A | 2/2006 |
| JP | 2006-171494 A | 6/2006 |
| JP | 2007-310303 A | 11/2007 |
| JP | 2010-039430 A | 2/2010 |

OTHER PUBLICATIONS

Notification of Reasons for Refusal; Patent Application No. 2010-090426; Dispatch No. 779168; Dispatch Date: Dec. 3, 2013.

* cited by examiner

*Primary Examiner* — Mekonnen Dagnew
(74) *Attorney, Agent, or Firm* — Canon U.S.A., Inc. IP Division

(57) ABSTRACT

An image pickup apparatus includes a photographic lens including a photographic optical system, a photographic camera configured to be attachable to and detachable from the photographic lens and including an image sensor configured to receive light from the photographic lens, and a receiving device connected to the photographic lens via a cable and configured to receive an operation signal for controlling the photographic lens or the photographic camera from a remote operation device, wherein the receiving device is configured to be fixable to the photographic lens or the photographic camera by a plurality of different methods.

16 Claims, 8 Drawing Sheets

RECEIVING DEVICE FOR RECEIVING A WIRELESS OPERATION SIGNAL FOR CONTROLLING A LENS OR A CAMERA BY A FIRST OR A SECOND METHOD

BACKGROUND OF THE INVENTION

1. Field of the Invention

The present invention relates to an image pickup apparatus, and particularly, to an image pickup apparatus capable of remotely and wirelessly controlling a television lens that is used for television shooting.

2. Description of the Related Art

When shooting is performed while a television camera is supported by a tripod, a camera operator adjusts zooming and focusing by operating a zoom controller and a focus controller that are connected to a photographic lens via a cable.

On the other hand, some image pickup apparatuses enable a camera operator to operate a zoom controller or a focus controller via wireless communication instead of wire communication.

For example, Japanese Patent Application Laid-Open No. 05-137043 discusses an image pickup apparatus in which a wireless receiving device is provided on the side surface of a large photographic lens used in studio shooting, and the lens is controlled via wireless communication with a controller present on a camera operator's hand. A cable disturbing a shooting operation is removed and is not necessary, so that it is easy to install an image pickup system.

Further, Japanese Patent Application Laid-Open No. 2006-033284 discusses a wireless remote control device which remotely operates a handy lens for shoulder-held shooting. In this device, a small receiving unit is connected to a connector provided at a grip portion of a photographic lens and a signal is transmitted from a remote controller attached to a pan rod of a tripod via wireless communication. In studio shooting using a handy camera, there is a case in which the camera operator suddenly performs shooting while holding a television camera, which is usually mounted on a tripod, on the operator's shoulder. When the photographic lens and the controller are connected to each other via a cable, it is necessary to perform the work of separating the cable from the lens apparatus. For this reason, there is an issue in that the current shooting style may not promptly switch to the shoulder-held shooting. Japanese Patent Application Laid-Open No. 2006-033284 discusses an example in which tripod shooting and shoulder-held shooting may promptly switch to each other via wireless communication between a photographic lens and a controller.

When the camera operator promptly detaches the photographic camera mounted on the tripod and wirelessly controlled from the tripod and uses the photographic camera for shooting, the photographic lens is manually operated. Thus, the wireless communication device detachably attached to the image pickup apparatus does not need to be provided, but shooting is continuously performed without any time to detach the wireless communication device. For this reason, the wireless communication device needs to be designed so as not to disturb the shooting operation.

When hand-held shooting is performed while the camera operator uses the handy camera for broadcast, shooting may be performed according to various styles. In general, a method is used in which the handy camera is carried by the camera operator's shoulder, the grip portion of the photographic lens is held by the right hand, and zooming or focusing is manually operated by the left hand. When an object is shot at a low angle, the handle at the upper portion of the camera is held by the right hand, and the camera is held closer to the knee to shoot the object. Likewise, various operation styles may be used depending on the shooting condition, but it is desirable that the receiving device necessary for wireless control does not disturb a manual shooting operation.

In Japanese Patent Application Laid-Open No. 05-137043, the receiving unit necessary for wireless communication is fixed to the side surface of the photographic lens. Here, there is no issue in a box-type lens for studio shooting mainly performing tripod shooting. However, in the handy camera for shoulder-held shooting, an operation ring is provided at an exterior surface of the photographic lens to operate zooming or focusing. For this reason, since the lens operation is disturbed if the receiving unit is provided near the photographic lens, this configuration is not practical.

In Japanese Patent Application Laid-Open No. 2006-033284, the wireless receiving unit is attached to the connector provided at the grip portion of the handy lens. However, if the receiving unit is provided at the grip portion held by the right hand when the handy camera carried by the shoulder, there is a possibility that the receiving unit may touch the right hand. This is not a great issue when the receiving unit is small. However, when shooting is performed while the photographic lens is loaded on a crane, a large-sized receiving unit is inevitably required for the purpose of ensuring a comparatively long communication distance. For this reason, when the receiving unit is provided near the grip portion of the photographic lens, the receiving unit may touch the hand holding the photographic lens and may disturb an operation in which the photographic lens is held by the right hand.

Further, the photographic lens or the photographic camera to which the receiving unit is detachably attached may have various shapes. The receiving unit needs to be detachably attached to any photographic equipment. Furthermore, it is desirable that the receiving unit does not disturb the shooting operation in any shooting style such as shoulder-held shooting or low-angle shooting.

SUMMARY OF THE INVENTION

The present invention is directed to an image pickup apparatus in which a receiving unit does not disturb a shooting operation.

According to an aspect of the present invention, an image pickup apparatus includes a photographic lens including a photographic optical system, a photographic camera configured to be attachable to and detachable from the photographic lens and including an image sensor configured to receive light from the photographic lens, and a receiving device connected to the photographic lens via a cable and configured to receive an operation signal for controlling the photographic lens or the photographic camera from a remote operation device, wherein the receiving device is configured to be fixable to the photographic lens or the photographic camera by a plurality of different methods.

According to an exemplary embodiment of the invention, a receiving device used for a wireless operation for a photographic lens may be detachably attached to various photographic equipment, and a user-friendly shooting condition may be provided in which a shooting operation is not disturbed even in any shooting style.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
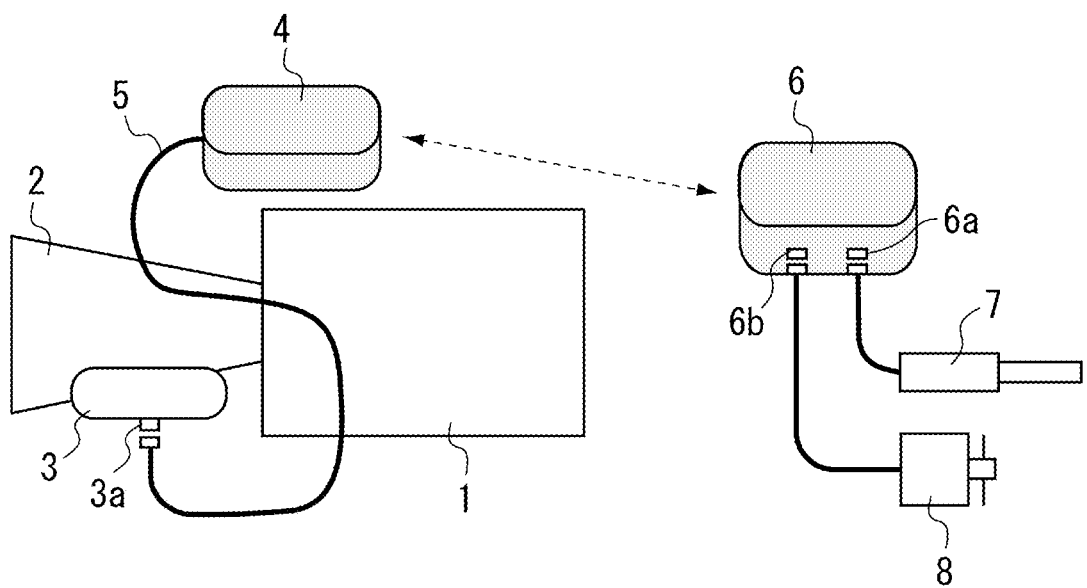
FIG. 1 is a system configuration diagram illustrating an image pickup apparatus that uses a wireless communication device according to an exemplary embodiment of the invention.

FIG. 1 is a system configuration diagram illustrating an image pickup apparatus (photographic system) that uses a wireless communication device according to an exemplary embodiment of the invention. A camera (a photographic camera or a camera body) 1 includes an image sensor (not illustrated and receiving (object) light from a lens apparatus), and outputs an image signal that is obtained by converting an image of an object formed on the image sensor into an electrical signal. The camera 1 is configured to be attachable to or detachable from the lens apparatus (a photographic lens, an interchangeable lens, or a zoom lens) 2, wherein the camera 1 is fixed to a tripod (not illustrated). The lens apparatus 2 can be detachably attached to the camera 1, and includes a photographic optical system that forms an image of an object on the image sensor. Further, the lens apparatus 2 includes a drive unit 3 that electrically controls zooming or focusing and is attached to the vicinity of the photographic optical system.

Further, when a camera operator performs shoulder-held shooting using the camera 1 (the camera 1 and the lens apparatus 2, or the image pickup apparatus), the camera operator performs shooting while holding the drive unit 3 by hand. Thus, the drive unit 3 includes an operation unit that is used for the camera operator to directly perform a variable magnification operation (a zooming operation or a zoom lens driving operation) or a focusing operation (a focusing operation or a focus lens driving operation).

A receiving unit 4 is fixed to the camera 1. The receiving unit 4 is connected (connector-connected) to a connector 3a of the drive unit 3 via a cable 5.

A transmission unit 6 wirelessly communicates with the receiving unit 4. The tripod includes a pan rod (not illustrated) that can be operated to adjust a shooting direction of the camera 1. The transmission unit 6 is fixed to the pan rod. The transmission unit 6 includes two connectors 6a and 6b, which are connected to a zoom controller 7 and a focus controller 8 via cables, respectively. The zoom controller 7 and the focus controller 8 are also fixed to the pan rod (not illustrated). When the camera operator operates the zoom controller 7 and the focus controller 8 on the operator's hand, a command signal (an operation signal) is wirelessly transmitted from the transmission unit 6 to the receiving unit 4. Based on the command signal received by the receiving unit 4, zooming, focusing, and the like of the lens apparatus 2 can be adjusted (which enables remote control or a remote operation). In addition, the transmission unit 6 can transmit an operation signal other than that for zooming or focusing, for example, an operation signal instructing an adjustment of an iris, a selection of a recording mode, a panning operation, a tilting operation, or the like.

In a recording site such as a studio using a handy camera, the camera operator may suddenly perform shoulder-held shooting by using the image pickup apparatus (the camera and the lens apparatus) used on the tripod. The lens apparatus 2 is operated via the wireless communication device, so that the camera operator may promptly switch between a shooting style using the camera held by the tripod and a shooting style using the image pickup apparatus (the camera and the lens apparatus) held by the operator's shoulder.

Further, when shooting is constantly performed with the camera 1 held by the tripod, the cables of the zoom controller 7 and the focus controller 8 may be directly connected to the connector 3a of the drive unit 3. In such a case, the receiving unit 4 and the transmission unit 6 are not necessary. Thus, it is desirable that the receiving unit 4 and the transmission unit 6 are configured to be easily attached to or detached from the photographic system. The receiving unit 4 and the transmission unit 6 can be attached to the photographic system according to the necessity, so that the convenience of the photographic system improves.

Further, the transmission function of the transmission unit 6 may be provided inside the zoom controller 7 and the focus controller 8. On the other hand, when the transmission unit 6 is used as an independent device that is connected to the existing controller via a cable, there is an advantage that the existing controller may be directly used. In a similar manner, when the receiving unit 4 is used as an independent device without providing the receiving unit 4 inside the drive unit 3, the existing lens apparatus may be directly used.

Figure 2:
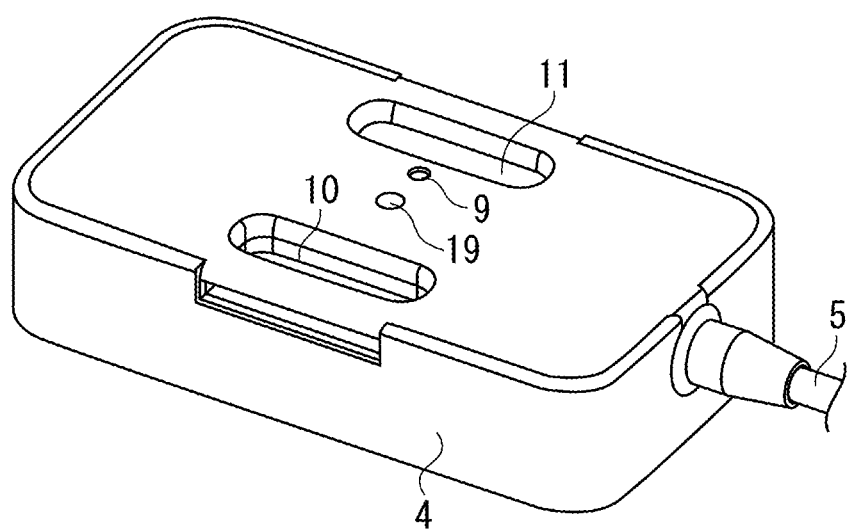
FIG. 2 is an external view illustrating a receiving device.

FIG. 2 is a structural diagram illustrating a shape of the receiving unit 4. In the present exemplary embodiment, the receiving unit 4 is configured to be attachable to or detachable from (fixable to) the camera 1. The cable 5 is connected to the drive unit 3 of the lens apparatus 2. The casing of the receiving unit 4 is formed of plastic, and an antenna for receiving a wireless signal is provided inside the casing. One surface of the casing is provided with a screw hole (which may be or may not be a through-hole) 9 used to attach another component to the casing and groove holes (through-holes) 10 and 11. As illustrated in FIG. 2, the groove hole 10 includes two open portions at two surfaces of the casing, and each open portion is formed in a shape elongated transversely or longitudinally (a length of a first direction is longer or shorter than a length of a second direction perpendicular to the first direction). Further, the groove hole 11 has a similar shape to that of the groove hole 10, and includes two open portions at two surfaces of the casing in the same manner as the groove hole 10.

A camera to which the receiving unit 4 can be attached may be formed in various shapes. The receiving unit 4 is required to be detachably attached to the camera having any shape. Further, a case may be supposed in which the camera operator performs shoulder-held shooting using the camera attached with the receiving unit 4. In this case, the tripod shooting suddenly switches to the shoulder-held shooting, or the lens is remotely operated by another lens operator moving with the camera operator since the camera operator has no time to operate zooming or focusing. Furthermore, the camera shooting may be performed according to various styles in which shooting is performed while the camera is held by the camera operator's shoulder or shooting is performed at a low angle while the handle of the camera is gripped by the camera operator. In all shooting methods, the receiving unit 4 needs to be controlled so as not to disturb the lens operation or the camera operation during shooting. Likewise, the fixing method or the fixing position of the receiving unit 4 needs to be set to satisfy many requirements.

Figure 3:
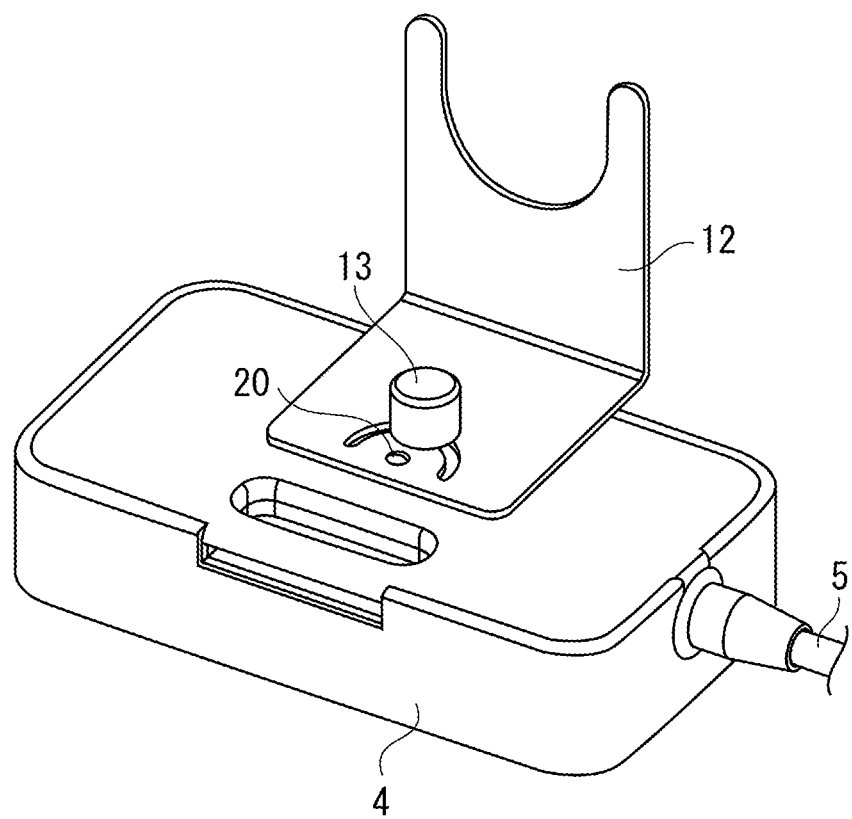
FIG. 3 is a structural diagram illustrating an attachment configuration of the receiving device.
Figure 4:
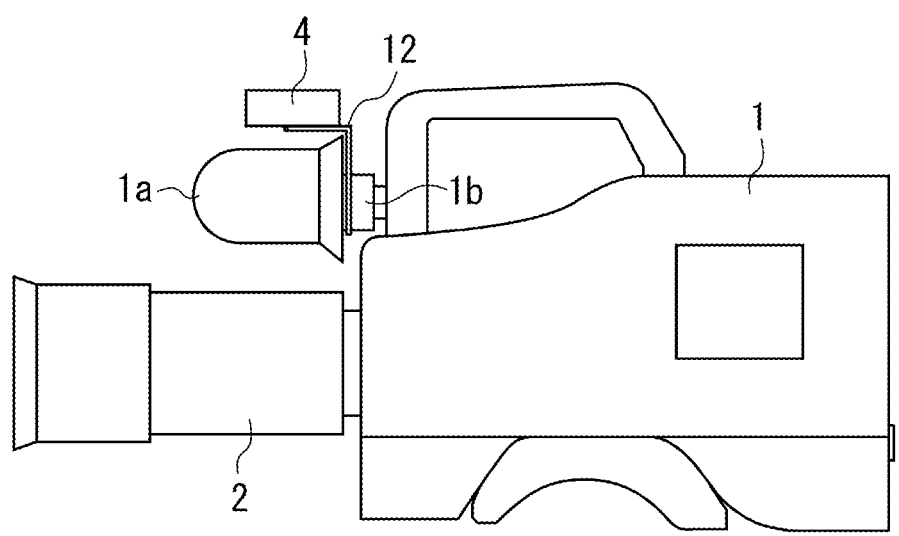
FIG. 4 is an external view illustrating the receiving device attached to a camera.

For this reason, in the present exemplary embodiment, the attachment method (the fixing method) of the receiving unit 4 to the camera 1 or the lens apparatus 2 can be selected from a plurality of different methods. Specifically, the receiving unit 4 includes a portion (a through-hole, a screw hole, a protrusion portion, or the like) corresponding to the selectable attachment method (the fixing method). Herein, the receiving unit 4 includes a first portion (a hole, a protrusion portion, or the like) corresponding to a first fixing method and a second portion (a hole, a protrusion portion, or the like) corresponding to a second fixing method. FIG. 3 is a diagram illustrating the first fixing method among the plurality of fixing methods, where the receiving unit 4 is fixed to the camera or the lens apparatus using an adapter member. A camera attachment plate (an adapter member) 12 is fixed to the screw hole 9 provided on the receiving unit 4 by a screw 13. FIG. 4 is an external view illustrating a state where the receiving unit 4 is fixed to the camera 1. In the present exemplary embodiment, the receiving unit 4 is located above a viewfinder 1a of the camera 1. The viewfinder 1a is fixed to the camera 1 by fastening an annular screw 1b. In the present exemplary embodiment, the camera attachment plate (the adapter member) 12 of the receiving unit 4 is inserted between the viewfinder 1a and the screw 1b, and the screw 1b is fastened to fix the receiving unit 4 to the camera 1. Since the receiving unit 4 is located above the viewfinder 1a, the receiving unit 4 does not disturb a shooting operation even when shooting is performed while the camera 1 is held by the camera operator's shoulder or shooting is performed at a low angle while the handle of the camera 1 is gripped by the camera operator. This is because the camera operator's hand rarely touches the upper portion of the viewfinder when the lens or the camera is operated. Further, when the receiving unit is disposed at the upper portion of the camera 1, this arrangement is advantageous in that the receiving characteristics improve since there is no signal receiving barrier around the receiving unit 4. Further, when the receiving unit 4 is located near the viewfinder 1a, the distance between the receiving unit 4 and the drive unit 3 is shortened, so that the length of the connected cable 5 can be shortened. As a result, the possibility of disturbing a shooting operation by the wired cable 5 can be reduced.

Further, the camera attachment plate 12 illustrated in FIG. 3 includes an engagement pin 20 which protrudes from the camera attachment plate 12 toward the receiving unit 4 and engages with a fitting hole 19 illustrated in FIG. 2. By loosening the screw 13 in FIG. 3, the attachment angle of the camera attachment plate 12 can be changed around the engagement pin 20. For example, if the receiving unit 4 disturbs a shooting operation when the viewfinder 1a of the camera 1 is lifted upward, the direction of the receiving unit 4 can be changed.

Figure 5:
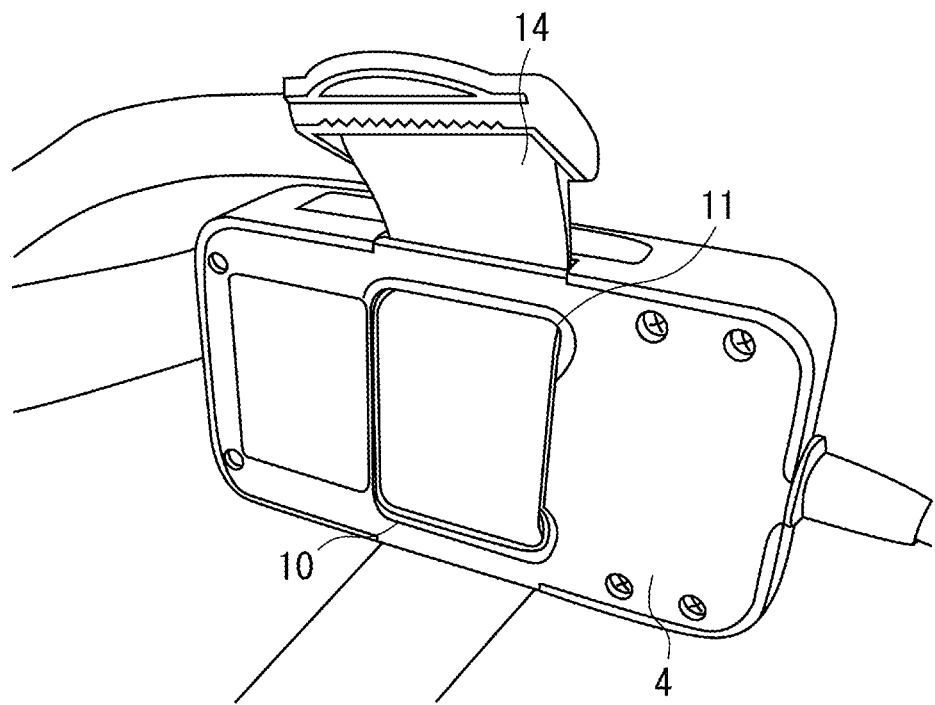
FIG. 5 is a diagram illustrating the receiving device to which a belt is attached.
Figure 6:
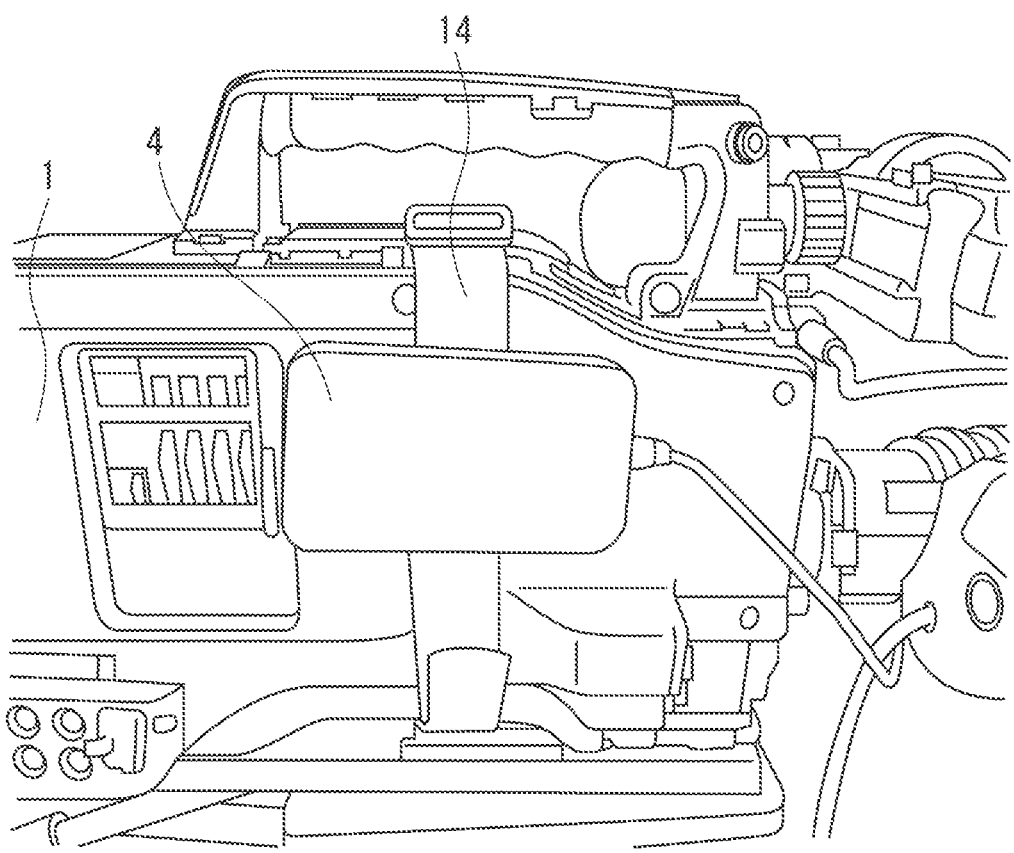
FIG. 6 is an external view illustrating the receiving device attached to the camera.

FIG. 5 is a structural diagram illustrating the second fixing method of the plurality of fixing methods. A belt (an adapter member) 14 passes through both two groove holes 10 and 11 provided on the receiving unit 4. FIG. 6 is a diagram illustrating a state where the receiving unit 4 is fixed to the camera 1 by the belt 14. The belt 14 passing through two groove holes 10 and 11 of the receiving unit 4 is further wrapped once around the exterior surface (the exterior, the outer periphery, or the outer peripheral surface) of the camera 1 (or the lens apparatus 2), and two ends of the belt 14 are fixed to each other by a hook and loop fastener provided at the two ends of the belt 14. In FIG. 6, the receiving unit 4 is fixed to the side surface of the camera 1 at the opposite side of the camera operator's face so that the receiving unit 4 does not disturb a shooting operation when the camera operator holds the image pickup apparatus (the camera and the lens apparatus) on the shoulder.

In FIG. 4, an example is shown in which the receiving unit 4 is located above the viewfinder 1a of the camera 1, but the invention is not limited to the configuration in which the receiving unit is fixed above the viewfinder of any camera. When the belt is used, the fixing position is not restricted, and the receiving unit 4 can be fixed to an arbitrary position. In addition, even in the case of a casing of a box-type lens such as a studio lens, the receiving unit 4 can be attached by using the belt.

Figure 7:
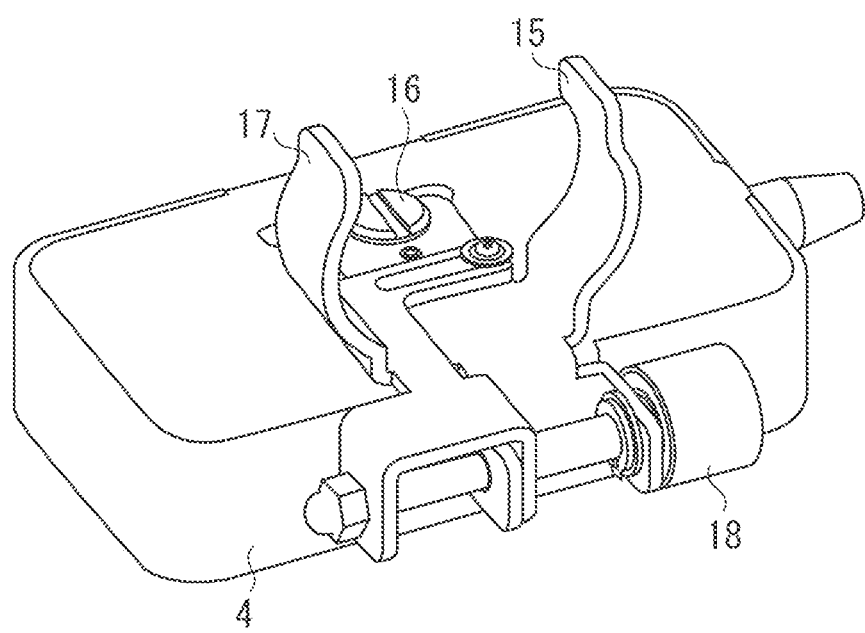
FIG. 7 is a structural diagram illustrating an attachment configuration of the receiving device.
Figure 8:
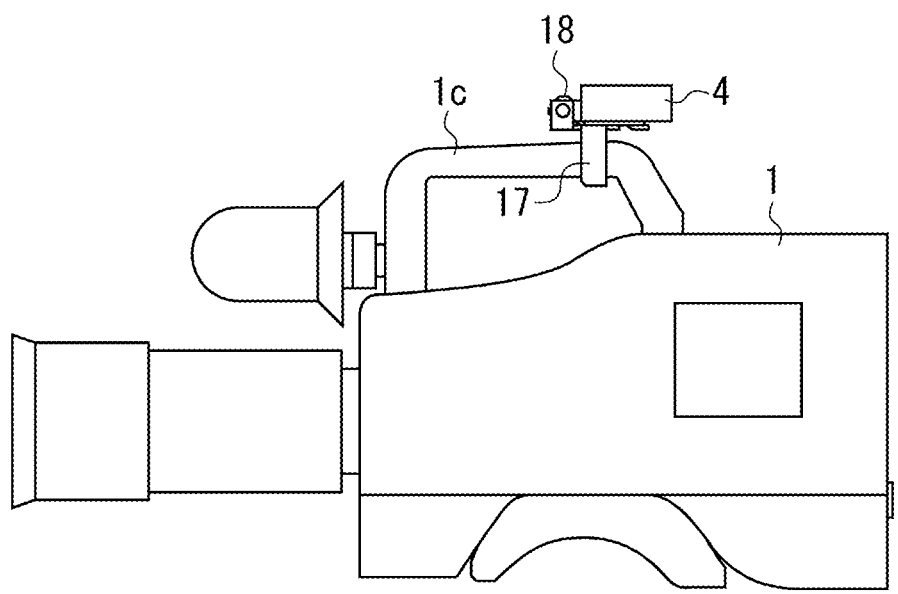
FIG. 8 is an external view illustrating the receiving device attached to the camera.

FIG. 7 is a structural diagram illustrating a third fixing method of the plurality of fixing methods. A fixed metal piece (an adapter member) 15 is fixed to the screw hole 9 of the receiving unit 4 illustrated in FIG. 2 by a screw 16. Further, a gap between a movable metal piece 17 and the fixed metal piece 15 may be adjusted by rotating a fastening knob 18. FIG. 8 illustrates a state where the receiving unit 4 is fixed to the camera 1. By fastening the fastening knob 18, the receiving unit 4 is fixed to the camera 1 with a handle 1c of the camera 1 pinched between the movable metal piece 17 and the fixed metal piece 15. Generally, a handle as illustrated in FIG. 8 is generally provided at the upper portion of the handy camera. When the handle is pinched between such metal pieces as those in the present exemplary embodiment, the receiving unit 4 can be securely fixed even when a strong impact is applied to the receiving unit 4 during shooting. Further, since the receiving unit 4 is located at the highest position of the camera 1, the wireless signal receiving characteristics can improve.

As described above, a casing of a receiving unit according to an exemplary embodiment of the invention is formed in a shape in which a plurality of fixing methods using a camera attachment plate and a belt can be used. A camera operator fixes the receiving unit by selecting one from the plurality of fixing methods depending on a shooting condition. Any receiving unit usable for remotely operating a lens apparatus (a photographic lens, an image pickup lens, or a zoom lens) may be attached to any photographic equipment, and may be attached thereto without disturbing a shooting operation in various shooting styles. As a result, even when shooting is performed by using the camera attached with the receiving device, the receiving device does not disturb a shooting operation, thus providing a user-friendly shooting condition.

In the above-described exemplary embodiment, an example is shown in which the receiving unit is disposed at the camera at three positions, but the receiving unit may be attached to a battery attachment portion at the rear portion of the camera. Further, the wireless communication device is exemplified for the purpose of remotely operating zooming or focusing of the lens, any type of information about shooting can be transmitted between the transmission unit and the receiving unit by two-way communication.

In the above-described exemplary embodiment, a case is described in which the receiving unit is attached to the camera 1 or the lens apparatus 2 by a plurality of different methods (there is a plurality of attachment methods). Here, it is desirable that the receiving unit is attached to a plurality of different places (portions) in the camera or the lens apparatus by a plurality of different methods. However, not all attachment places may be different (at least two or more attachment places may be provided), and not all attachment methods may be different (at least two or more methods may be used for attachment). In addition, the receiving device can be configured to be fixable to a photographic lens or a photographic camera via a plurality of different portions of the receiving device.

According to the above-described exemplary embodiment, the receiving device usable for remotely and wirelessly operating the photographic lens may be attached to any photographic equipment, and may be attached without disturbing a shooting operation even in various shooting styles. As a result, a user-friendly shooting condition can be obtained regardless of shooting using the camera supported by the tripod or shooting using the camera held by the hand or the shoulder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-090426 filed Apr. 9, 2010, which is hereby incorporated by reference herein in its entirety.

What is claimed is:

1. An image pickup apparatus comprising:
   a photographic lens including a photographic optical system;
   a photographic camera configured to be attachable to and detachable from the photographic lens and including an image sensor configured to receive light from the photographic lens; and
   a receiving device configured to wirelessly receive an operation signal for controlling the photographic lens or the photographic camera from a remote operation device,
   wherein the receiving device includes a first hole to be used for fixing the receiving device to the photographic lens or the photographic camera by a first method and two second holes to be used for fixing the receiving device to the photographic lens or the photographic camera by a second method different from the first method, and
   wherein the two second holes are passed through with a belt for fixing the receiving device, the two second holes being longer in a first direction, the two second holes are arranged in a second direction different from the first direction with respect to each other.

2. The image pickup apparatus according to claim 1, wherein the second method is a fixing method for fixing the receiving device such that the belt wraps an outer periphery of the photographic camera or the photographic lens.

3. The image pickup apparatus according to claim 1, wherein the first hole is a screw hole.

4. The image pickup apparatus according to claim 3, wherein the first method is a fixing method in which an adapter member is fixed to a casing of the receiving device by a screw fixed in the screw hole.

5. The image pickup apparatus according to claim 4, wherein the adapter member is inserted between a viewfinder of the photographic camera and a fixing screw used to fix the viewfinder, and the fixing screw is fastened such that the receiving device is located above the viewfinder of the photographic camera.

6. The image pickup apparatus according to claim 1,
   wherein the second method is a fixing method for fixing the receiving device such that a belt wraps an outer periphery of the photographic camera or the photographic lens, and
   wherein the first method is a fixing method in which an adapter member is fixed to a casing of the receiving device, the adapter member is inserted between a viewfinder of the photographic camera and a fixing screw used to fix the viewfinder, and the fixing screw is fastened.

7. The image pickup apparatus according to claim 1, wherein the first method is a fixing method in which an adapter member is fixed to the receiving device, the adapter member is fixed to the photographic camera.

8. The image pickup apparatus according to claim 1,
   wherein the second method is a fixing method for fixing the receiving device such that a belt wraps an outer periphery of the photographic camera or the photographic lens, and
   wherein the first method is a fixing method in which an adapter member is fixed to the receiving device, the adapter member is fixed to the photographic camera.

9. A receiving device configured to wirelessly receive an operation signal for controlling a photographic lens or a photographic camera from a remote operation device, the receiving device comprising:
   a first hole to be used for fixing the receiving device to the photographic lens or the photographic camera by a first method; and
   two second holes to be used for fixing the receiving device to the photographic lens or the photographic camera by a second method different from the first method,
   wherein the two second holes are passed through with a belt for fixing the receiving device, the two second holes being longer in a first direction, the two second holes are arranged in a second direction different from the first direction with respect to each other.

10. The receiving device according to claim 9, wherein the second method is a fixing method for fixing the receiving device such that the belt wraps an outer periphery of the photographic camera or the photographic lens.

11. The receiving device according to claim 9, wherein the first hole is a screw hole.

12. The receiving device according to claim 11, wherein the first method is a fixing method in which an adapter member is fixed to a casing of the receiving device by a screw fixed in the screw hole.

13. The receiving device according to claim 12, wherein the adapter member is inserted between a viewfinder of the photographic camera and a fixing screw used to fix the viewfinder, and the fixing screw is fastened such that the receiving device is located above the viewfinder of the photographic camera.

14. The receiving device according to claim 9,
   wherein the second method is a fixing method for fixing the receiving device such that a belt wraps an outer periphery of the photographic camera or the photographic lens, and
   wherein the first method is a fixing method in which an adapter member is fixed to a casing of the receiving device, the adapter member is inserted between a viewfinder of the photographic camera and a fixing screw used to fix the viewfinder, and the fixing screw is fastened.

15. The receiving device according to claim 9, wherein the first method is a fixing method in which an adapter member is fixed to the receiving device, the adapter member is fixed to the photographic camera.

16. The receiving device according to claim 9, wherein the second method is a fixing method for fixing the receiving device such that a belt wraps an outer periphery of the photographic camera or the photographic lens, and wherein the first method is a fixing method in which an adapter member is fixed to the receiving device, the adapter member is fixed to the photographic camera.

* * * * *